United States Patent
Lee et al.

(10) Patent No.: US 6,791,780 B2
(45) Date of Patent: Sep. 14, 2004

(54) METHOD AND APPARATUS FOR PROVIDING WRITE CURRENT OPTIMIZATION

(75) Inventors: Hae Jung Lee, Santa Clara, CA (US); Sang Lee, Pleasanton, CA (US); Keung Youn Cho, San Jose, CA (US); Ken Bovatsek, San Jose, CA (US)

(73) Assignee: Samsung Electronics Co., Inc. (KR)

( * ) Notice: Subject to any disclaimer, the term of this patent is extended or adjusted under 35 U.S.C. 154(b) by 353 days.

(21) Appl. No.: 09/978,904

(22) Filed: Oct. 15, 2001

(65) Prior Publication Data

US 2003/0072100 A1 Apr. 17, 2003

(51) Int. Cl.[7] .................................................. G11B 5/03
(52) U.S. Cl. ............................. 360/66; 360/31; 360/53
(58) Field of Search ........................... 360/31, 53, 66, 360/67, 68

(56) References Cited

U.S. PATENT DOCUMENTS

| | | |
|---|---|---|
| 3,834,392 A | 9/1974 | Lampman et al. |
| 4,343,300 A | 8/1982 | Hattori |
| 4,499,895 A | 2/1985 | Takayama |
| 4,572,198 A | 2/1986 | Codrington |
| 4,573,452 A | 3/1986 | Greenberg |
| 4,601,705 A | 7/1986 | McCoy |
| 4,621,618 A | 11/1986 | Omagari |
| 4,633,304 A | 12/1986 | Nagasaki |
| 4,672,963 A | 6/1987 | Barken |
| 4,758,222 A | 7/1988 | McCoy |
| 4,785,806 A | 11/1988 | Deckelbaum |
| 4,788,975 A | 12/1988 | Shturman et al. |
| 4,790,813 A | 12/1988 | Kensey |
| 4,821,125 A * | 4/1989 | Christensen et al. .......... 360/31 |
| 4,875,897 A | 10/1989 | Lee |
| 4,887,605 A | 12/1989 | Angelsen et al. |

(List continued on next page.)

FOREIGN PATENT DOCUMENTS

EP          0079524 A1      5/1983

Primary Examiner—David Hudspeth
Assistant Examiner—Daniell L. Negron
(74) Attorney, Agent, or Firm—Irell & Manella LLP; Jeffrey P. Aiello

(57) ABSTRACT

The present invention is a method and system to optimize a write channel in a hard disk drive. The method comprises providing a disk having a at least one side with a plurality of tracks, and selecting a target track from the plurality of tracks. Data is written at least once on a predetermined plurality of tracks adjacent to either side of the target track and on the target track. Data is also written a predetermined number of times on tracks immediately adjacent to the target track. Data written on the predetermined plurality of tracks adjacent to either side of the target track and on the target track is then read. The process then determines if a number of errors on the tracks is greater than a predetermined criteria, if so, a write current value of the write channel is decreased, otherwise the write current value is increased.

30 Claims, 4 Drawing Sheets

U.S. PATENT DOCUMENTS

| | | |
|---|---|---|
| 4,974,607 A | 12/1990 | Miwa |
| 4,996,975 A | 3/1991 | Nakamura |
| 5,078,714 A | 1/1992 | Katims |
| 5,104,392 A | 4/1992 | Kittrell et al. |
| 5,125,888 A | 6/1992 | Howard et al. |
| 5,170,299 A | 12/1992 | Moon |
| 5,203,781 A | 4/1993 | Bonati et al. |
| 5,217,001 A | 6/1993 | Nakao et al. |
| 5,217,003 A | 6/1993 | Wilk |
| 5,217,453 A | 6/1993 | Wilk |
| 5,228,429 A | 7/1993 | Hatano |
| 5,233,482 A | 8/1993 | Galbraith et al. |
| 5,259,365 A | 11/1993 | Nishikori et al. |
| 5,268,803 A | 12/1993 | Sugita et al. |
| 5,274,510 A | 12/1993 | Sugita et al. |
| 5,301,080 A | 4/1994 | Ottesen et al. |
| 5,335,121 A | 8/1994 | Bombeeck |
| 5,335,123 A | 8/1994 | Shimizu et al. |
| 5,367,409 A | 11/1994 | Ottesen et al. |
| 5,368,015 A | 11/1994 | Wilk |
| 5,384,671 A | 1/1995 | Fisher |
| 5,388,127 A | 2/1995 | Scarpa |
| 5,402,280 A | 3/1995 | Supino |
| 5,483,393 A | 1/1996 | Mento et al. |
| 5,497,111 A | 3/1996 | Cunningham |
| 5,523,899 A | 6/1996 | Parken et al. |
| 5,539,714 A | 7/1996 | Andrews, Jr. et al. |
| 5,566,101 A | 10/1996 | Kodra |
| 5,581,420 A | 12/1996 | Chainer et al. |
| 5,583,842 A * | 12/1996 | Wilson et al. ........... 369/53.17 |
| 5,590,154 A | 12/1996 | Forni et al. |
| 5,606,469 A | 2/1997 | Kosugi et al. |
| 5,608,587 A | 3/1997 | Smith |
| 5,615,058 A | 3/1997 | Chainer et al. |
| 5,781,133 A | 7/1998 | Tsang |
| 5,822,143 A | 10/1998 | Cloke et al. |
| 5,844,920 A | 12/1998 | Zook et al. |
| 5,862,007 A | 1/1999 | Pham et al. |
| 5,898,532 A | 4/1999 | Du et al. |
| 5,961,658 A | 10/1999 | Reed et al. |
| 6,094,316 A | 7/2000 | Pham et al. |
| 6,275,346 B1 * | 8/2001 | Kim et al. .................... 360/31 |

* cited by examiner

METHOD AND APPARATUS FOR PROVIDING WRITE CURRENT OPTIMIZATION

BACKGROUND OF THE INVENTION

1. Field of the Invention

The present invention relates in general to disk storage systems and more particularly, to methods and apparatus for providing write current optimization in a hard drive assembly, so as to reduce the effects of adjacent track erasure and poor writing performance in low temperature environments.

2. Description of the Related Art

Disk drives are magnetic recording devices used for the storage of information. The information is typically recorded on concentric tracks on either surface of one or more magnetic recording disks. The disks are rotatably mounted to a spin motor and information is accessed by means of read/write heads that are mounted to actuator arms which are rotated by a voice coil motor. The voice coil motor is excited with a current to rotate the actuator and move the heads. The read/write heads must be accurately aligned with the storage tracks on the disk to ensure proper reading and writing of information. The read/write heads read recorded information from the surface of the disk by sensing the magnetic transitions emanating from the surface of the disk.

To write on a data track, current is applied to the head. The current generates a magnetic field, which magnetizes the surface of the disk. Recording density may be increased by reducing the head/disk distance. This may be accomplished by reducing the size of the read/write heads and to position the heads as near to the disk as possible. However, as magnetic recording heads become smaller in physical dimensions, the amount of write current applied to the head may result in erasing data located on adjacent tracks. This is of concern when the write current that is applied is too high. On the other hand, poor writing performance occurs, especially in low temperature environments, when the write current is not sufficient.

Accordingly, there is a need in the technology for a method and apparatus for providing write current optimization in a disk in a hard drive assembly while overcoming the aforementioned problems.

BRIEF SUMMARY OF THE INVENTION

The present invention is a method and system to optimize a write channel in a hard disk drive. The method comprises providing a disk having a at least one side with a plurality of tracks, and selecting a target track from the plurality of tracks. Data is written at least once on a predetermined plurality of tracks adjacent to either side of the target track and on the target track. Data is also written a predetermined number of times on tracks immediately adjacent to the target track. Data written on the predetermined plurality of tracks adjacent to either side of the target track and on the target track is then read. The process then determines if a number of errors on the tracks is greater than a predetermined criteria, if so, a write current value of the write channel is decreased, otherwise the write current value is increased.

DETAILED DESCRIPTION OF THE INVENTION

The present invention is an apparatus and methods for providing write current optimization in a hard disk drive assembly while reducing the effects of adjacent track erasure and poor writing performance in a low temperature environment.

Figure 1:
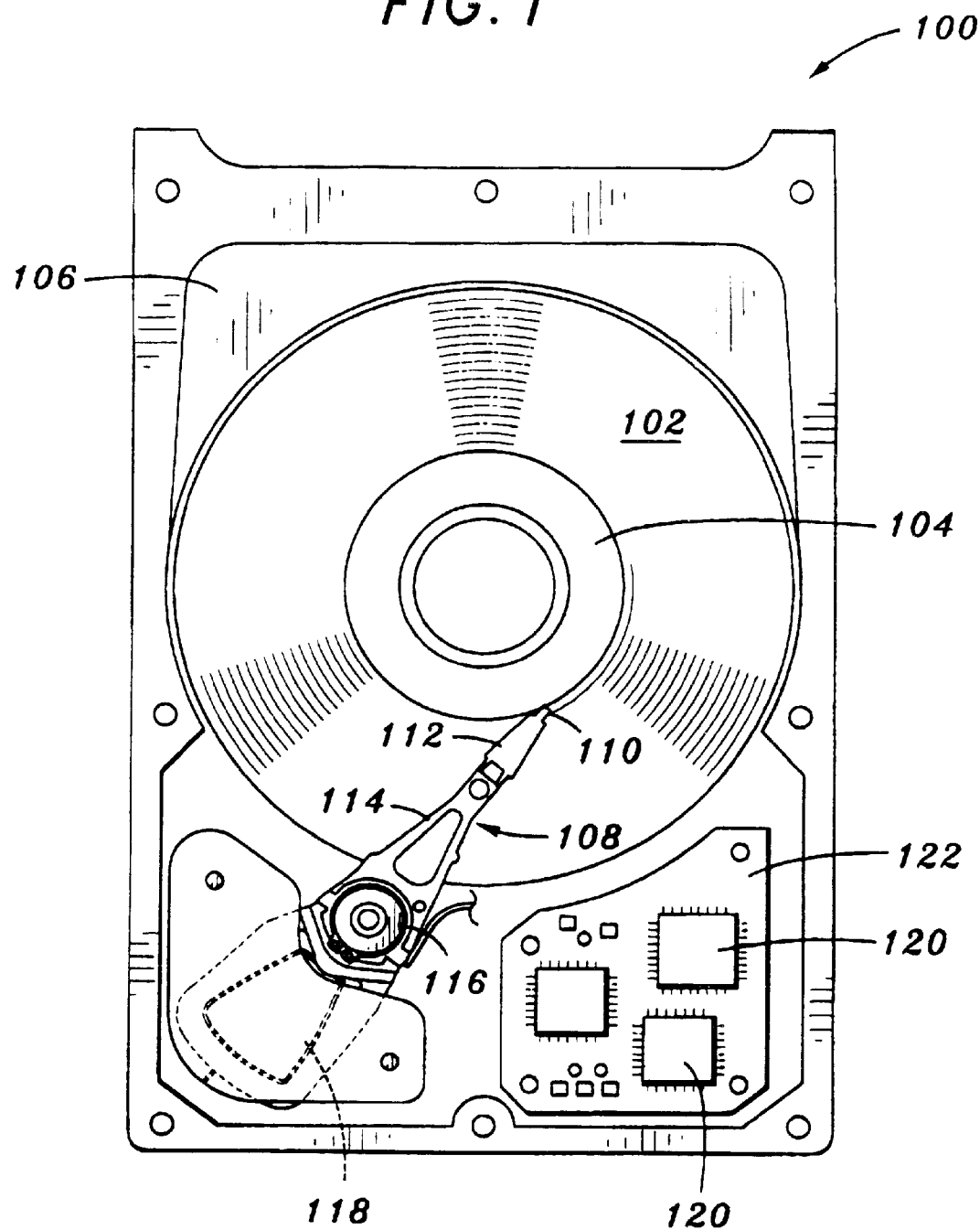
FIG. 1 illustrates the starting position of a typical read head and the subsequent position of the read head after one revolution.

Referring to the drawings more particularly by reference numbers, FIG. 1 shows a hard disk drive 100. The disk drive 100 includes a disk 102 that is rotated by a spin motor 104. The spin motor 104 is mounted to a base plate 106. Also mounted to the base plate 106 is an actuator arm assembly 108. The actuator arm assembly 108 includes a number of heads 110 mounted to corresponding flexure arms 112. The flexure arms 112 are attached to an actuator arm 114 that can rotate about a bearing assembly 116. The assembly 108 also contains a voice coil 118 that is coupled to the magnets 119 that are mounted to the base plate 106. Energizing the voice coil 118 moves the heads 110 relative to the disk 102. There is typically a single head for each disk surface. The spin motor 104, voice coil 118 and the heads 110 are coupled to a number of electronic circuits 120 mounted to a printed circuit board 122. In the following discussion, only one head 110 is referenced. The electronic circuits 120 typically include a read channel circuit, a microprocessor-based controller and a random access memory (RAM) device.

Figure 2:
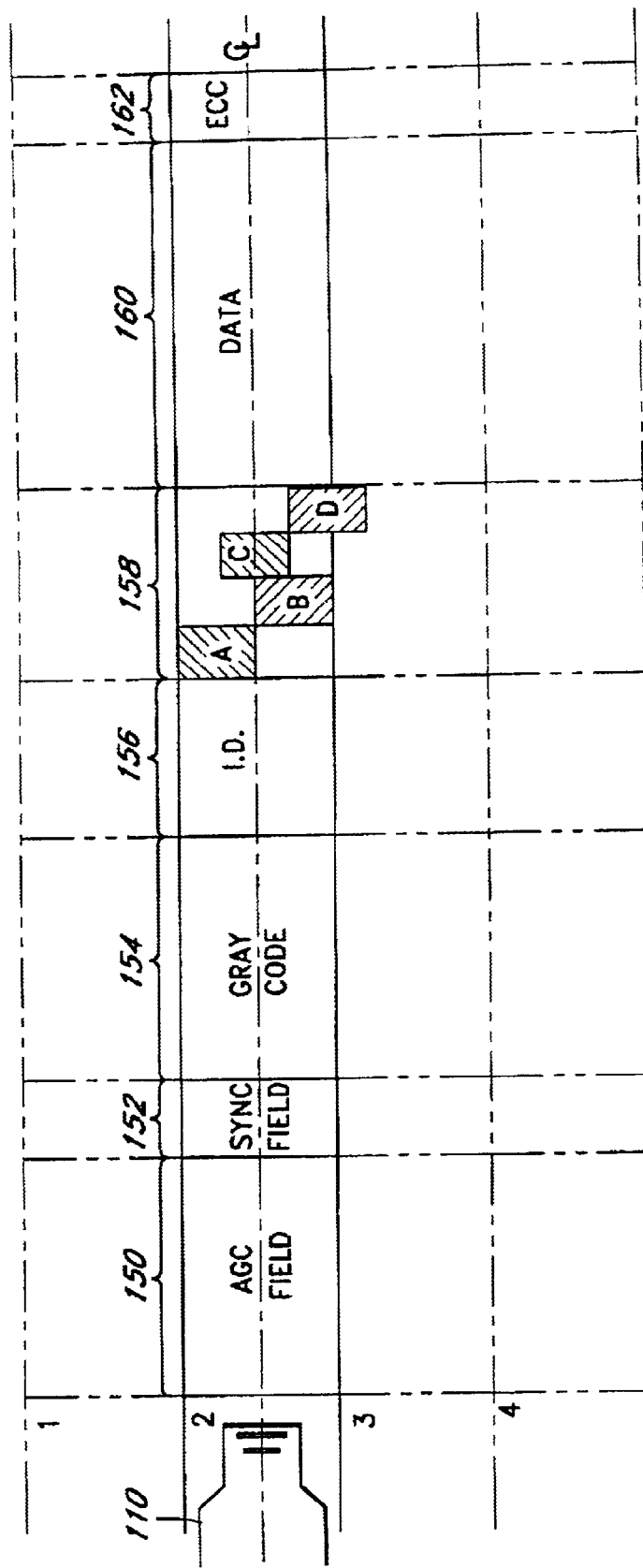
FIG. 2 illustrates a hard disk drive which utilizes the methods of the invention.

As shown in FIG. 2, data is typically stored within sectors of radially concentric tracks located across the disk 102. A typical sector will have an automatic gain control (AGC) field 150, a synchronization (sync) field 152, a gray code field 154 that identifies the track, an identification (ID) field 156 that defines the sector, a servo field 158 which includes a number of servo bits A, B, C, D, a data field 160 which contains the data and an error correction code field 162. In operation, the head 110 is moved to a track and the servo information provided in servo field 158 is read and provided to the electronic circuits 120. The electronic circuits 120 utilize the variation in the servo bits (A–B) or (C–D) to generate Q, a positioning signal for aligning the head 110.

Figure 3:
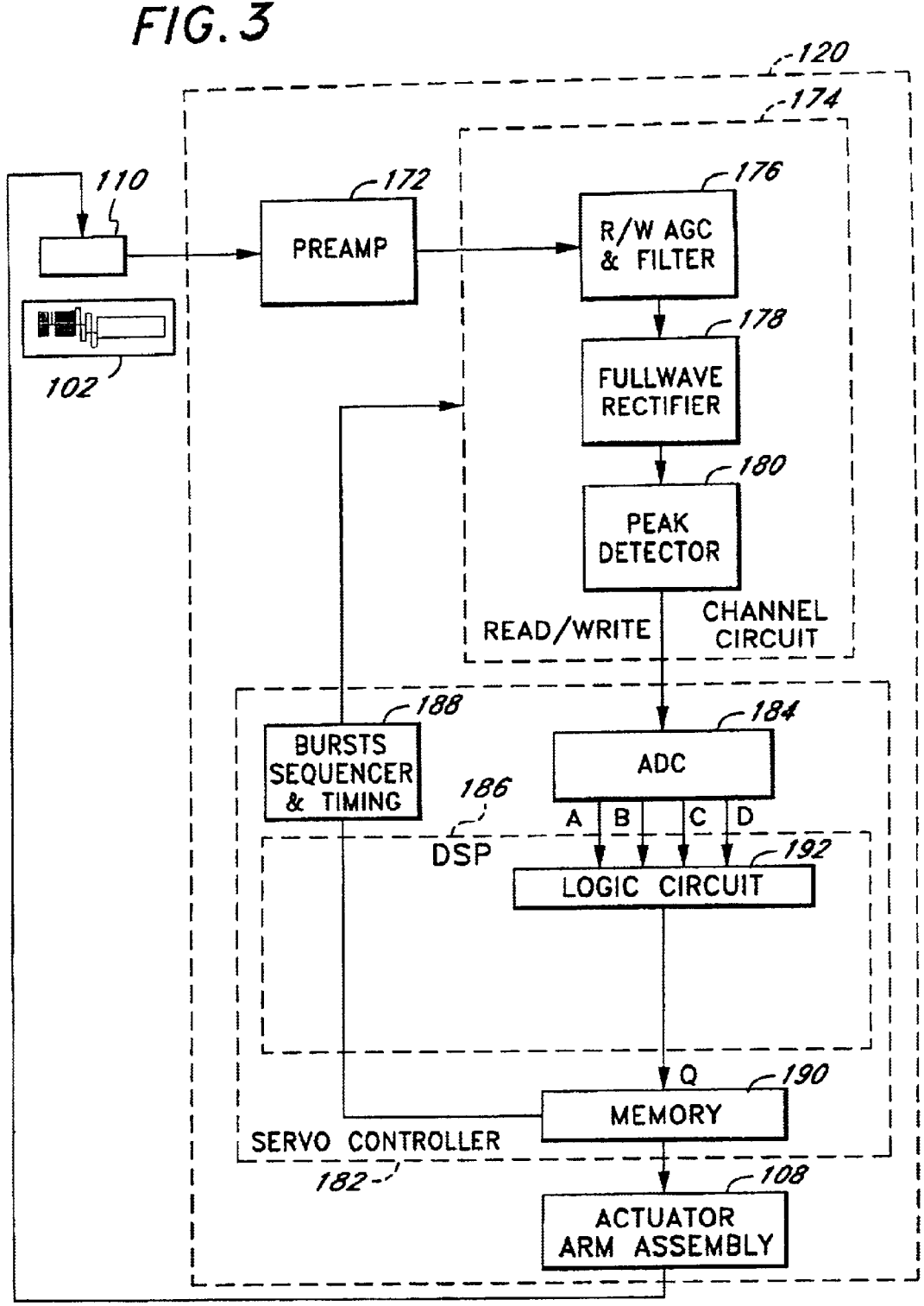
FIG. 3 illustrates the general layout of the servo field region of a track.

FIG. 3 is a block diagram of an electronic circuit 120 of the drive. The electronic circuit 120 includes a preamplifier 172 which is coupled to a read/write (R/W) channel circuit 174. The R/W channel circuit 174 includes a R/W Automatic Gain Control (AGC), a filter circuit 176, a fullwave rectifier 178 and a peak detector 180. The electronic circuit 120 further comprises a microprocessor-based servo controller 182 which includes an analog-to-digital converter (ADC) 184, a digital signal processor (DSP) 186, a burst sequencer and timing circuit 188 and a memory 190, such as a random access memory (RAM) device. The DSP 186 includes a logic circuit 192.

The electronic circuit 120 is coupled to one of the magnetic heads 110 which senses the magnetic field of a magnetic disk 102. When reading the servo information located in the servo field region 10 on the disk 102, the head 110 generates a read signal that corresponds to the magnetic field of the disk 102. The read signal is first amplified by the preamplifier 172, and then provided to the R/W channel circuit 174. The AGC data included in the read signal is provided to the R/W AGC and filter circuit 176. The R/W AGC circuit in circuit 176 monitors the AGC data provided by the read signal and the read signal is then filtered by the filter circuit located in the R/W AGC and filter circuit 176. The fullwave rectifier 178 rectifies the read signal and provides the rectified read signal to the peak detector 180. The peak detector 180 detects the amplitude of the read signal. The read signal is then provided to the ADC 184 which provides digitized samples of the analog read signal. The digitized signal is then provided to a logic circuit 192 located within the DSP 186. The logic circuit 192 generates a position signal Q, based on the servo bits A, B, C and D that are read by the head 110. The resulting position signal Q may be stored in memory 190 and is subsequently provided to the actuator arm assembly 108 to move the heads 110. Alternatively, the position signal Q can be provided directly to the actuator arm assembly 108 to move the heads 110.

The present invention facilitates optimization of the write current applied to a read/write head in a hard disk drive, so as to reduce adjacent track erasure effects and poor writing performance in low temperature environments. To implement such a process, all write function-related channel parameters should be optimized. The optimization technique may be based on a comparison of the error rate or channel quality of a read back signal. Examples of write function-related channel parameters include the write-channel pre-compensation values. Write current boost values and write current values. One embodiment of such a process may proceed as follows. A target track N that is error-free is first selected. A number of successive tracks adjacent to either side of the track N are also determined. An example of these tracks include tracks (N−5) to (N+5). With all write function-related parameters optimized or as selected, a signal is written once to the tracks (N−5) through (N+5) (eleven tracks total). The read/write head is micro jogged to a track adjacent to N, e.g., (N−1) and instructed to write a predetermined number of times, e.g., Y, to (N−1). In one embodiment, Y is 1000 to 2000 times. The read/write head is similarly micro jogged to the other track that is adjacent to N, e.g., (N+1) and instructed to write a predetermined number of times, e.g., Y, to (N+1).

The process then determines if there are errors on tracks (N−5) through (N+5) due to the multiple times of writing data to tracks (N−1) and (N+1). To do this, the read/write head is instructed to read the data written on tracks (N−5) to (N+5) a predetermined number of times Y. The process then determines if the number of errors on each track is greater than a predetermined criteria. The predetermined criteria may be one error. Thus, if thee number of errors on each track is greater than the predetermined criteria (e.g., more than one error), the write channel parameter is changed to reduce the adjacent track erasure effect. This may be performed by reducing or decreasing the write current or write boost value. For example, the write boost value may be decreased by one level, assuming that there are 16 levels of write boost current values, although it is to be understood that the value to be decreased is up to the user.

The writing/reading process as described earlier may then be repeated again for further optimization. At the end of the writing/reading process, the process again compares the number of errors to a predetermined criteria. If the number of errors is greater than a predetermined number, the process decreases the write current or write boost value by a predetermined number. If the number of errors is less than the predetermined number, the process either keeps the current write current or write boost value or decreases the write current or write boost value by a predetermined number. The process the re-optimizes the write-channel parameters based on the selected write current or write boost value.

If the number of errors is less than or equal to the criteria, the process changes the write channel parameter to enhance the writing of the head. This may be done by increasing the write current or write boost value. For example, the write boost value may be increased by one level, assuming that there are 16 levels of write boost current values, although it is to be understood that the value to be increased is up to the user.

The writing/reading process as described earlier may then be repeated again for further optimization. At the end of the writing/reading process, the process again compares the number of errors to a predetermined criteria. If the number of errors is greater than a predetermined number, the process decreases the write current or write boost value by a predetermined number. If the number of errors is less than the predetermined number, the process either keeps the current write current or write boost value or decreases the write current or write boost value by a predetermined number. The process the re-optimizes the write-channel parameters based on the selected write current or write boost value.

This process may be repeated several times at different areas of the disk and the corresponding parameter for each area may be determined and selected based on the optimum write current or write boost values. This information may be stored and used subsequently to optimize the write channel.

Figure 4:
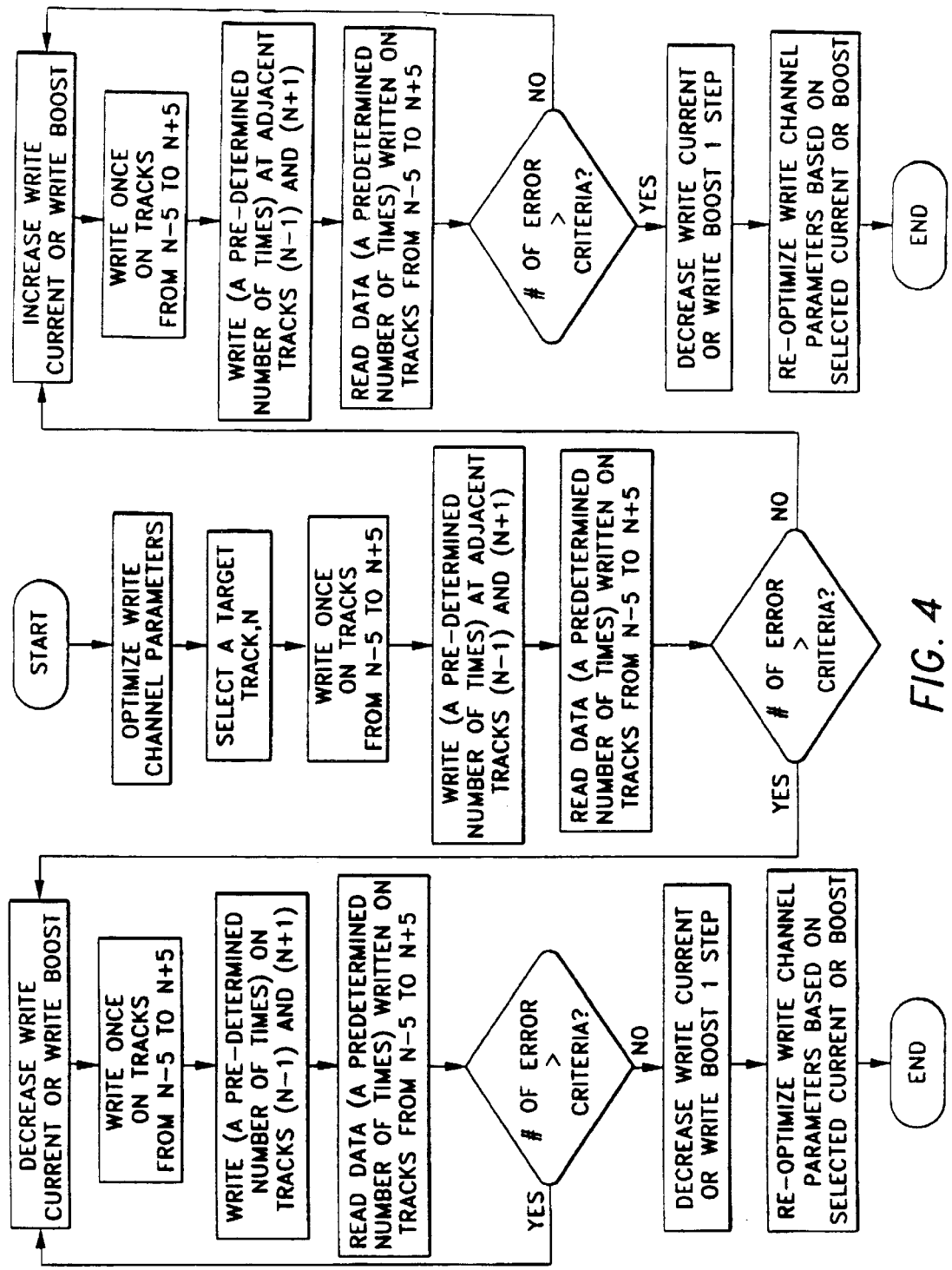
FIG. 4 is a block diagram of portions of an integrated circuit read channel in accordance with the present invention

FIG. 4 is a flow chart that illustrates one embodiment of the write channel optimization process provided in accordance with the principles of the invention. Proceeding from a start state, the process 400 proceeds to process block 402, where the write channel parameters are first optimized. A target track, e.g., track N, is next selected (process block 404). The head is moved to track (N−5) and is instructed to write once on each track from track (N−5) to track (N+5) (process block 406). Next, the process writes a pre-determined number of times Y on tracks adjacent to the selected track N, i.e., on tracks (N−1) and (N+1).

When the writing process has been completed, the process 400 directs the read/write head to read the data written on tracks (N−5) through (N+5) (process block 412). The process 400 then determines in decision block 412, if the number of errors on each track is greater than a predetermined criteria. In one embodiment, the predetermined criteria is the number of errors on track N before its adjacent tracks (N−1) and (N+1) have been written to Y times (as shown in process block 408). Alternatively, the predetermined criteria is an error threshold established prior to the writing of data to tracks (N−1) and (N+1) Y times.

If the number of errors are greater than the predetermined criteria, the process advances to process block 414, where it decreases the write current or write boost value. The process 400 then proceeds to process block 416, where it writes once on tracks (N−5) through (N+5). The process 400 then writes a pre-determined number of times Z, on tracks adjacent to the selected track N, i.e., on tracks (N−1) and (N+1) (process block 418). When the writing process is completed, the process 400 instructs the read/write head to read the data written on tracks (N−5) through (N+5). The process 400 then determines if the number of errors encountered on each track (N−5) through (N+5) is greater than the predetermined criteria. If so, the process 400 returns to process block 414. Otherwise, the process decreases the write current or the write boost value by one level (process block 424). The process 400 then re-optimizes the write channel parameters based on the selected current or boost value (process block 426) and terminates.

If, at decision block 412, the process 400 determines that the number of error is not greater than the predetermined criteria, it proceeds to process block 428, where it increases the write current or write boost value. The process 400 then proceeds to process block 430, where it writes once on tracks (N−5) through (N+5). The process 400 then writes a pre-determined number of times Z, on tracks adjacent to the selected track N, i.e., on tracks (N−1) and (N+1) (process block 432). When the writing process is completed, the process 400 instructs the read/write head to read the data written on tracks (N−5) through (N+5) (process block 432). The process 400 then determines if the number of errors encountered on each track (N−5) through (N+5) is greater than the predetermined criteria (decision block 436). If so, the process 400 returns to process block 428. Otherwise, the process 400 decreases the write current or the write boost value by one level (process block 438). The process 400 then re-optimizes the write channel parameters based on the selected current or boost value (process block 440) and terminates.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed:

1. A method to optimize a write channel in a hard disk drive, comprising:
   a) providing a disk having at least one side with a plurality of tracks;
   b) selecting a target track from said plurality of tracks;
   c) writing at least once on a predetermined plurality of tracks adjacent to either side of said target track and on said target track;
   d) writing a predetermined number of times on tracks immediately adjacent to said target track;
   e) reading data written on said predetermined plurality of tracks adjacent to either side of said target track and on said target track;
   f) determine if a number of errors on said tracks is greater than a predetermined criteria, if so, decreasing a write current value of said write channel, otherwise increasing said write current value;
   g) repeating steps c) through e); and, determining if a number of errors on said tracks is greater than a second predetermined criteria, if so, decreasing a write current value of said write channel, and repeating steps g) and h); otherwise decreasing said write current value, and re-optimizing said predetermined number of write channel parameters.

2. The method as recited in claim 1, further comprising optimizing a predetermined number of write channel parameters prior to acts b) through f).

3. The method as recited in claim 1, wherein in c), said predetermined plurality of tracks adjacent to said selected track includes five successive tracks adjacent to and on either side of said selected track.

4. The method as recited in claim 1, wherein in d), said predetermined number of times comprises at least 100 times.

5. The method as recited in claim 1, wherein said predetermined criteria comprises no more than one error on each track in said predetermined plurality of tracks.

6. The method as recited in claim 1, wherein in f), if said number of errors is less than or equal to predetermined criteria, then increasing said write current value, said method further comprising repeating: c) through e), and g) determining if a number of errors on said tracks is greater than a second predetermined criteria, if not, increasing a write current value of said write channel, and repeating steps c) through e) and g); otherwise decreasing said write current value, and re-optimizing said predetermined number of write channel parameters.

7. The method as recited in claim 1, wherein said predetermined write channel parameters comprises write channel pre-compensation values.

8. The method as recited in claim 1, further comprising storing target track number, write channel parameters and write current value in memory.

9. A system to optimize a write channel in a hard disk drive, comprising:
   a housing;
   a spin motor mounted to said housing;
   an actuator arm mounted to said spin motor; a disk attached to said spin motor, said disk having at least one side with a plurality of tracks;
   a memory to store instruction sequences;
   a processor coupled to said memory;
   a read/write head mounted to said actuator arm to write on and read from said at least one side of said disk, said read/write head coupled to said processor, wherein said processor executes said instruction sequences to:
   a) provide a disk having a at least one side with a plurality of tracks;
   b) select a target track from said plurality of tracks;
   c) write at least once on a predetermined plurality of tracks adjacent to either side of said target track and on said target track;
   d) write a predetermined number of times on tracks immediately adjacent to said target track;
   e) read data written on said predetermined plurality of tracks adjacent to either side of said target track and on said target track;
   f) determine if a number of errors on said tracks is greater than a predetermined criteria, if so, decreasing a write current value of said write channel, otherwise increasing said write current value;
   g) repeating c) through e); and,
   h) determining if a number of errors on said tracks is greater than a second predetermined criteria, if so decreasing a write current value of said write channel, and repeating steps g) and h); otherwise decreasing said write current value, and re-optimizing said predetermined number of write channel parameters.

10. The system as recited in claim 9, wherein said instruction sequences further cause said processor to optimize a predetermined number of write channel parameters prior to acts b) through f).

11. The system as recited in claim 9, wherein in c), said predetermined plurality of tracks adjacent to said selected track includes five successive tracks adjacent to and on either side of said selected track.

12. The system as recited in claim 9, wherein in d), said predetermined number of times comprises at least 100 times.

13. The system as recited in claim 9, wherein said predetermined criteria comprises no more than one error on each track in said predetermined plurality of tracks.

14. The system as recited in claim 9, wherein in f), if said number of errors is less than or equal to predetermined criteria, then increasing said write current value, and repeating: c) through e), and g) determining if a number of errors on said tracks is greater than a second predetermined criteria, if not, increasing a write current value of said write channel, and repeating steps c) through e) and g); otherwise decreasing said write current value, and re-optimizing said predetermined number of write channel parameters.

15. The system as recited in claim 9, wherein said predetermined write channel parameters comprises write channel pre-compensation values.

16. The system as recited in claim 9, further comprising storing a target track number, write channel parameters and write current value in memory.

17. A method to optimize a write channel in a hard disk drive, comprising:
   a) providing a disk having at least one side with a plurality of tracks;
   f) selecting a target track from said plurality of tracks;
   g) writing at least once on a predetermined plurality of tracks adjacent to either side of said target track and on said target track;
   h) writing a predetermined number of times on tracks immediately adjacent to said target track;
   i) reading data written on said predetermined plurality of tracks adjacent to either side of said target track and on said target track;
   f) determine if a number of errors on said tracks is greater than a predetermined criteria, if so, decreasing a write current value of said write channel, otherwise increasing said write current value;
   g) repeating steps c) through e); and,
   h) determining if a number of errors on said tracks is greater than a second predetermined criteria, if not, increasing a write current value of said write channel, and repeating g) and h); otherwise decreasing said write current value, and re-optimizing said predetermined number of write channel parameters.

18. The method as recited in claim 17, further comprising optimizing a predetermined number of write channel parameters prior to acts b) through f).

19. The method as recited in claim 17, wherein in c), said predetermined plurality of tracks adjacent to said selected track includes five successive tracks adjacent to and on either side of said selected track.

20. The method as recited in claim 17, wherein in d), said predetermined number of times comprises at least 100 times.

21. The method as recited in claim 17, wherein said predetermined criteria comprises no more than one error on each track in said predetermined plurality of tracks.

22. The method as recited in claim 17, wherein said predetermined write channel parameters comprises write channel pre-compensation values.

23. The method as recited in claim 17, further comprising storing a target track number, write channel parameters and write current value in memory.

24. A system to optimize a write channel in a hard disk drive, comprising:
   a housing;
   a spin motor mounted to said housing;
   an actuator arm mounted to said spin motor; a disk attached to said spin motor, said disk having at least one side with a plurality of tracks;
   a memory to store instruction sequences;
   a processor coupled to said memory;
   a read/write head mounted to said actuator arm to write on and read from said at least one side of said disk, said read/write head coupled to said processor, wherein said processor executes said instruction sequences to:
   a) provide a disk having a at least one side with a plurality of tracks;
   f) select a target track from said plurality of tracks;
   g) write at least once on a predetermined plurality of tracks adjacent to either side of said target track and on said target track;
   h) write a predetermined number of times on tracks immediately adjacent to said target track;
   i) read data written on said predetermined plurality of tracks adjacent to either side of said target track and on said target track;
   f) determine if a number of errors on said tracks is greater than a predetermined criteria, if so, decreasing a write current value of said write channel, otherwise increasing said write current value;
   g) repeating c) through e); and,
   h) determining if a number of errors on said tracks is greater than a second predetermined criteria, if not, increasing a write current value of said write channel, and repeating g) and h); otherwise decreasing said write current value, and re-optimizing said predetermined number of write channel parameters.

25. The system as recited in claim 24, wherein said instruction sequences further cause said processor to optimize a predetermined number of write channel parameters prior to acts b) through f).

26. The system as recited in claim 24, wherein in c), said predetermined plurality of tracks adjacent to said selected track includes five successive tracks adjacent to and on either side of said selected track.

27. The system as recited in claim 24, wherein in d), said predetermined number of times comprises at least 100 times.

28. The system as recited in claim 24, wherein said predetermined criteria comprises no more than one error on each track in said predetermined plurality of tracks.

29. The system as recited in claim 24, wherein said predetermined write channel parameters comprises write channel pre-compensation values.

30. The system as recited in claim 24, further comprising storing a target track number, write channel parameters and write current value in memory.

* * * * *